9244X
Sheet 1. 2. Sheets.
R. Porter.
Floating Dock.
Patented Nov. 14, 1835.
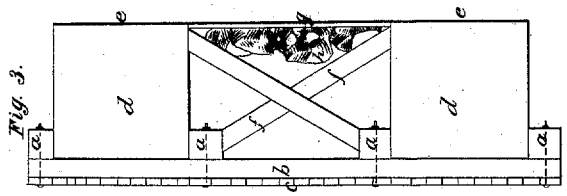
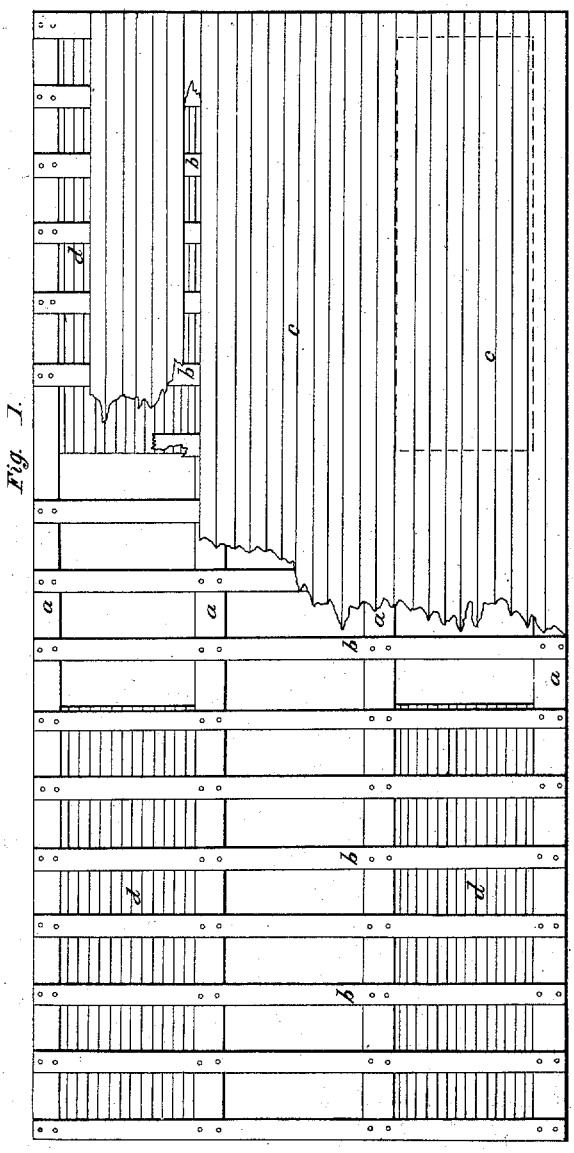
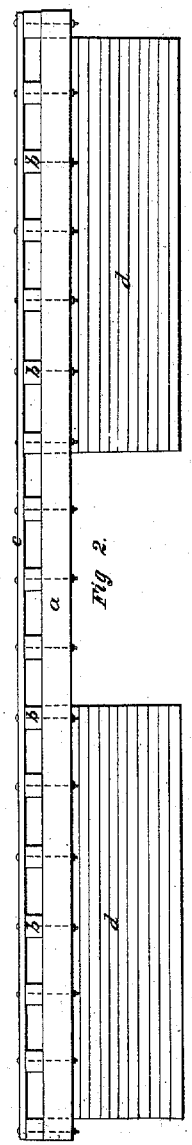

9244X
Sheet 2. 2 Sheets
R. Porter.
Floating Dock.
Patented Nov. 14, 1835.
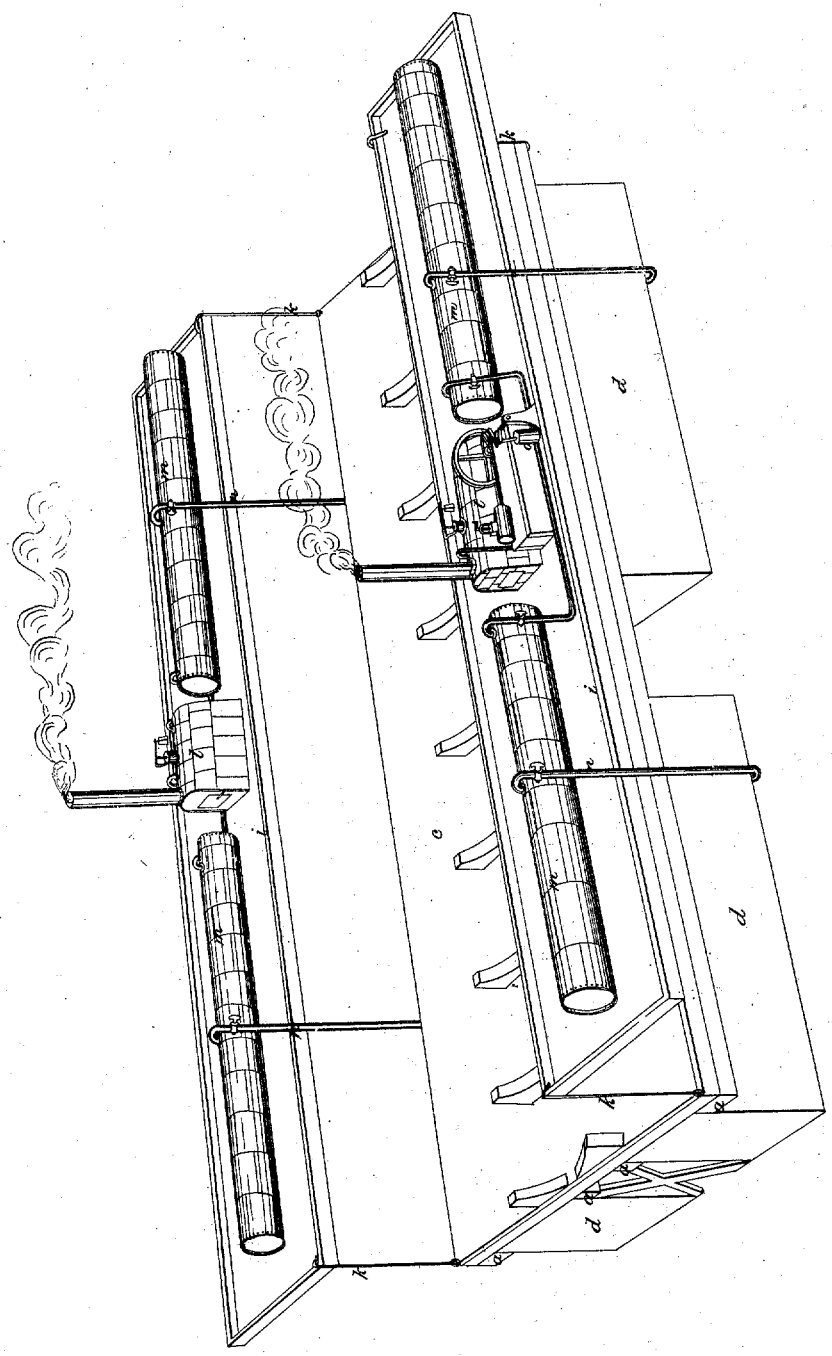

[illegible] 14.1835

9244X

Rufus Porter, of Billerica, Mss:
Letters Patent

The schedule referred to in these Letters Patent, and making part of the same,
containing a description in the words of the said Rufus Porter himself of his im-
provement in the floating dry dock for raising Vessels — -

---

To all to whom these presents shall come:
Be it known that I Rufus Porter of Billerica in the County of Middlesex and State
of Massachusetts have invented a new and useful apparatus and mode of using the same
for raising vessels for the purpose of repair, and that the following is a full and exact
description of the construction and operation of the said apparatus as invented by me.
Four large square timbers eighty feet in length are placed parallel to each other
and so arranged that the space between each pair is ten feet, and the whole breadth
across the four is forty feet. Across these are placed at equal distances seventeen other
timbers forty feet long being firmly secured to the first four by trunnels and over
these last is laid a strong plank floor, the whole constituting a stage or platform
eighty feet in length and forty in breadth. This platform rests on four square trunks,
each being thirty feet long ten feet wide and ten feet deep. These trunks are construc-
ted of framed timber and planks, and are closed and made tight on all sides
except an open space of ten feet in length by four, in breadth in the center of the
bottom of each, and are placed under the four corners of the platform, between the
long timbers above mentioned, so that only the cross timbers rest on the tops of the trunks.
The platform is further supported by braces extending diagonally from the sides of the
trunks near the bottoms to the middle of the cross timbers. The bottoms of the trunks are
also connected by iron rods, crossing from one to the other. The platform and trunks which
thus connected I call an elevator being put into the water (or rather having been
constructed afloat) a sufficient quantity of stone is placed on the iron rods to cause
the whole to sink when filled with water —
Two scows each eighty feet long, and eight feet wide are kept in attendance one
of which floats over each side of the elevator and ropes being attached to the four
corners of the elevator or arms projecting therefrom, are also made fast to the
bows and stern of each scow, thus preventing the elevator from sinking below

9244X a certain depth, say twelve feet below the surface of the water. each Scow contains besides a small steam engine of one horse power two hollow cylinders similar to the cylindric boiler of high pressure engine each cylinder being thirty feet long and thirty inches in diameter. From each of the four cylinders a piece of leather hose extends to one of the four trunks being firmly attached to each —

These cylinders being charged by the power of the steam engines, with fifteen atmospheres of compressed air, the vessel to be raised is floated between the scows, or if the vessel lays at anchor the scows may be propelled by the steam power, to a station on each side of the vessel dragging the elevator with them which is then raised by the ropes, till the middle of the floor comes in contact with the keel of the vessel and is secured in that position by several ropes or chains, which being attached to the sides of the elevator are made fast to the timber heads of the vessel, moreover several chucks or blocks previously prepared and connected with the elevator are placed under the bottom of the vessel to support the same in its position when raised. Then by means of valves the compressed air in the cylinders is permitted to escape through the hose to the interior of the trunks which immediately gives them a bouyancy of about seven hundred thousand pounds — —

But if the vessel thus raised be of such a size as not to require so much power of bouyancy the compressed air may be instantly shut off whenever the floor of the elevator shall have risen fairly above the surface of the water.

While one vessel is being repaired the cylinders are again charged, and when the repairs of one are completed other valves are opened which permits the air to escape from the trunks, while the vessel settles readily but gently into the water, and the elevator is ready to receive another, thus avoiding the ordinary delay attendant on raising vessels by the usual methods — I claim the construction and mode of using the elevator generally.

Witnesses
Tracy Peck
Rachel R. Peck

Rufus Porter

Exd.
H.G.